Aug. 16, 1960 B. C. BENEDICT 2,949,419
DEOILING PETROLEUM WAX
Filed Dec. 2, 1957
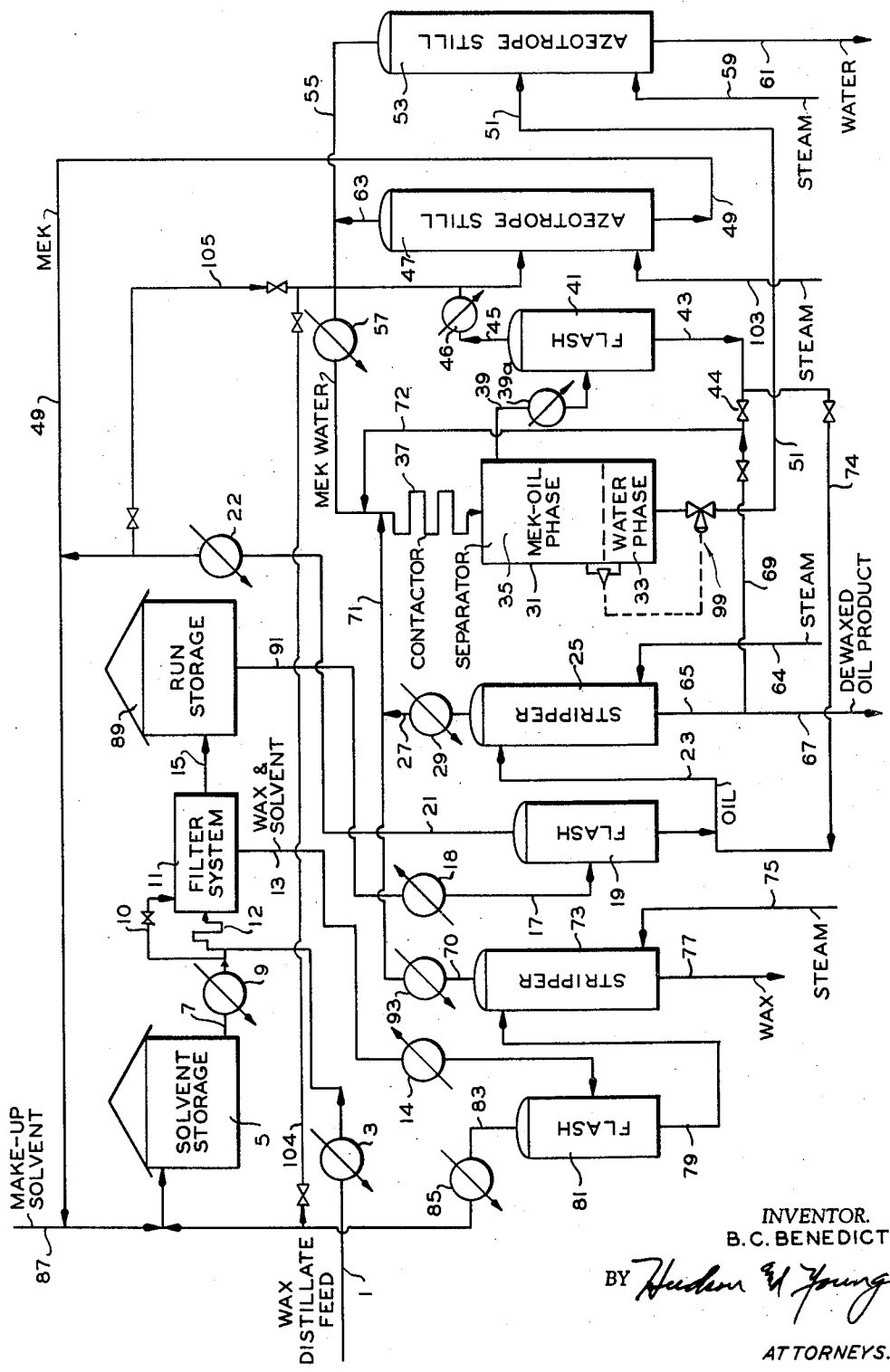
INVENTOR.
B. C. BENEDICT
BY Hudson E. Young
ATTORNEYS.

United States Patent Office 2,949,419
Patented Aug. 16, 1960

2,949,419
DEOILING PETROLEUM WAX

Bruce C. Benedict, Bartlesville, Okla., assignor to Phillips Petroleum Company, a corporation of Delaware Filed Dec. 2, 1957, Ser. No. 700,213

7 Claims. (Cl. 208—31)

This invention relates to a method for the operation of deoiling processes in the separation of wax and oil from mixture of the two. In one aspect it relates to deoiling of wax precipitated from waxy oils in wax-oil separation processes. In another aspect it relates to a method of dehydrating an aqueous oil diluent or solvent used in deoiling wax precipitated from waxy oils in the absence of or in the presence of the diluent or solvent.

This application is a continuation in part of my application Serial No. 577,475, filed April 11, 1956, now Patent No. 2,907,709.

An object of this invention is to provide an improved deoiling process for separation of wax and oil from mixtures of the two.

Another object of this invention is to provide an easily operable method for deoiling wax precipitated from waxy oils in the absence of or in the presence of diluent or solvent.

Still another object of my invention is to provide such a deoiling process in which aqueous oil diluent or solvent is dehydrated without use of conventional salt towers.

Another object of my invention is to provide a process which when beginning with an anhydrous or substantially anhydrous oil diluent or solvent the process maintains this diluent or solvent in an anhydrous or substantially anhydrous condition over long periods of use.

Yet another object of my invention is to provide a unitary wax separation and recovery process in which wax is precipitated from the waxy oil in the absence of or in the presence of a dewaxing diluent or solvent and employing an improved wax deoiling step therein.

Still other objects and advantages of my invention will be realized by those skilled in the art upon reading the following description which, taken with the attached drawing, forms a part of this specification.

While my novel "deoiling of wax" process is exemplified herein specifically in a process for the treatment of a wax and oil mixture for the production of an oil-free wax product, my "deoiling of wax" process is equally applicable in processes for treatment of wax and oil mixtures for the production of wax-free oil products.

The invention finds particular use in the treatment of wax and oil mixtures in the production of candlewax, paper coating wax, etc., and in the production of lubricating oils, fuel stocks produced from waxy petroleum oils, and many other oils requiring dewaxing.

In many instances in wax-oil separation operations, it is advantageous to chill the waxy oil to crystallize the wax in the oil prior to addition of diluent or solvent. In some cases the precipitated wax is easier to filter and to deoil than when the wax is precipitated from an oil-diluent mixture. Most prior art methods of dewaxing involve addition of a diluent, for example, liquid propane, methylethylketone or a diluent mixture such as, for example, acetone and benzene, to the waxy oil, with the addition of heat to affect solution, followed by chilling and wax precipitation. The wax of some wax-containing oils when so precipitated is not easily to filter from the oil-diluent mixture, and deoiling the oily wax with diluent wash is a difficult operation because the wax crystals are of such form as to form a compact, non-permeable filter bed.

A prior art method has been described in which a waxy oil is chilled to precipitate the wax in the absence of a conventional dewaxing diluent. The diluent or washing agent is then added to expedite removal of the oil from the precipitated wax. While a major proportion of the diluent, for example, methylethylketone, can be removed from the washed wax and from the filtrate by flashing, final traces of the diluent usually have to be removed by steam stripping, or by distillation with heat. When stripping with steam the stripped diluent, upon condensation, is an aqueous diluent solution, in case the diluent and water are soluble in each other. When methylethylketone is employed as the diluent and wash liquid, steam stripping of the wax and of the dewaxed oil yields methylethylketone-water solutions. Methylethylketone in water distills as an azeotrope and the excess of water over that required to form the azeotrope is removed from the kettle of the still. The azeotrope is passed through a salt tower for removal of the water and dehydration of the diluent, after which treatment the dehydrated diluent is ready for reuse in the system. Such an operation is described in Jenkins 2,379,868, and this patentee employs salt towers for the final drying steps.

The use of salt towers for drying water-containing materials has many disadvantages, one being consumption of the salt in the form of brine. Disposal of such brine is also a problem. Sediment from the salt bed is carried from the tower with the dried material. Salt beds tend to cake and channel with the result that drying is frequently inefficient. Rusting of equipment from contact with the brine produced causes high maintenance costs.

One prior art method for dehydrating aqueous dewaxing diluent utilizes waxy oil feed stock to a wax-oil separating system for extracting the diluent from a diluent-water solution produced in the operation. This type of operation is disadvantageous because it introduces the diluent into the wax-oil charge stock prior to crystallization of the wax. As mentioned hereinbefore, it is preferable in some cases not to add diluent to the wax-oil stock prior to crystallization of the wax.

I solve this problem by employing a quantity of the final wax-free oil for extracting diluent from the diluent-water solution, followed by phase separation, and then I remove in simple flashing and steam distillation steps dry diluent or solvent for reuse in the original steps of the operation. More particularly my invention includes a process for dehydrating an aqueous oil diluent mixture comprising adding a dewaxed oil to said mixture thereby producing an oil diluent phase containing said oil and dissolved water, and a water phase containing dissolved oil diluent, separating these phases, flash vaporizing the separated oil diluent phase thereby producing a vaporous oil diluent-water mixture and a flashed oil bottoms, condensing the vaporous mixture thereby producing a condensate, distilling this condensate to produce an overhead vaporous azeotrope of said diluent and water and a dry bottoms oil diluent product and recovering this latter product as a dehydrated product of the operation. As mentioned above the distilling operation of the condensate is preferably a steam distilling or steam stripping operation.

As applied to a complete wax deoiling operation my invention includes a continuous process for deoiling wax of a waxy oil feed comprising chilling the oil feed to a wax precipitation temperature, chilling methylethylketone to substantially said temperature, mixing the chilled methylethylketone and chilled feed, filtering precipitated wax from the mixture to produce a wax containing a minor amount of methylethylketone and oil and a filtrate comprising dewaxed oil and methylethylketone, flash vaporizing methylethylketone from the wax-methylethylketone-oil mixture to produce a first methylethylketone flash vapor and a flashed wax bottoms, steam stripping the remainder of the methylethylketone from the flashed wax bottoms thereby producing a first vaporous water-methylethylketone mixture and a methylethylketone-free wax, condensing said first vaporous water-methylethylketone mixture and introducing the condensate into a phase separation step subsequently described, flash vaporizing the methylethyl ketone of said filtrate thereby producing a flashed oil containing a minor proportion of methylethylketone and a second methylethylketone flash vapor, steam stripping the flashed oil to produce a methylethylketone-free oil and a second vaporous water-methylethylketone mixture, condensing this latter vaporous water-methylethylketone mixture, introducing this latter formed condensate into said phase separation step, separating in said phase separation step a methylethylketone-rich phase containing oil as subsequently produced and dissolved water and a water-rich phase containing dissolved methylethylketone, azeotropically distilling said water-rich phase to produce a first methylethylketone-water azeotrope and a bottoms water product, condensing this azeotrope and introducing same into said phase separation step, withdrawing said water product from the azeotrope distilling operation, flash vaporizing said methylethylketone-rich phase containing oil and water to produce a vaporous methylethylketone and water mixture and a flashed oil bottoms, condensing this latter vaporous mixture and azeotropically distilling the condensate thereby producing a second vaporous methylethylketone-water azeotrope and a bottoms methylethylketone, condensing this latter vaporous azeotrope and introducing the condensate into said phase separation step, withdrawing flash oil bottoms from the flash vaporizing of said methylethylketone-rich phase as said oil as subsequently produced, withdrawing said bottoms methylethylketone from the latter azeotropic distillation step, condensing the first and second methylethylketone flash vapors, combining the bottoms methylethylketone and the condensed first and second methylethylketone flash vapors as the first-mentioned methylethylketone, mixing said flashed oil bottoms with the condensed first and second vaporous water-methylethylketone mixtures and with the condensed first and second azeotrope prior to introduction of these latter mentioned condensed mixtures and azeotrope into said phase separation step and removing the dewaxed and methylethylketone-free oil as a main product of the operation.

I use throughout these specifications and claims the terms solvent and diluent interchangeably. The term washing agent is also used sometimes in place of diluent or solvent. In my wax and oil separating operations, I use methylethylketone as the diluent or washing agent. Other diluents or washing agents can under some conditions be used, but most of the other diluents possess disadvantages and are not widely used. For example, acetone dissolves only relatively small proportions of wax, and similarly it dissolves only correspondingly small portions of oil. Thus, if acetone were used in wax deoiling operations excessively large quantities of acetone would be required to wash the oil from the wax. The large quantities of acetone dissolve relatively large amounts of wax, and this solution wax then remains in the oil with the resultant loss in wax yield. In oil production, wax carried into the oil in this manner results in a high pour point oil. Ketones of higher molecular weight than methylethylketone are not as easily removed by flashing from the wax or from the oil as is methylethylketone, hence their use is sometimes undesirable. Water is in general only slightly soluble in the higher molecular weight ketones and hence when they are used they do not present the water solubility problems as does methylethylketone. Oil is soluble in methylethylketone, thus requiring only a minimum amount of the solvent for washing the oil from the wax.

Methylethylketone is relatively easily removed from the wax and from the oil filtrate in a low-temperature flashing operation. The remainder or final traces of the ketone are removed usually by steam stripping. It is this steam stripping operation which forms the major portion of the methylethylketone-water solutions from which the water must be removed before the methylethylketone is suitable for reuse in the deoiling system. As mentioned above, I employ a portion of the final wax-free oil product for extracting methylethylketone from the ketone-water solution and then flash vaporize the major portion of the ketone and the water from the oil and a major portion of this ketone-water mixture is recovered as strictly dry or anhydrous ketone in an azeotropic distillation operation. The dry ketone so produced is suitable for reuse in the system.

In the drawing, the figure illustrates in diagrammatic form, an arrangement of apparatus parts suitable for carrying out the operation of my process.

Referring now to the drawing, reference numeral 1 identifies a pipe through which a wax distillate or a waxy oil feed stock flows from a source, not shown, into my system. This oil is chilled in a chiller 3 for precipitation of the wax in the presence of only the oil. Diluent or solvent from a storage tank 5 is passed through a pipe 7 to a chiller 9 in which it is chilled to substantially the same temperature as that imparted to the waxy oil in chiller 3. The chilled solvent is added to the chilled wax-containing oil in pipe 1 and the mixture is passed through a mixer 12 into a filter system 11. Additional solvent or diluent for wax washing purposes is passed from the outlet of chiller 9 through a pipe 10 into the filter system. Filter systems such as that required herein are conventional in the art, and the system will not be described in detail for purposes of brevity. The system, however, includes one or more filters and one or more washing steps in which the wax cake is washed with fresh diluent, as from pipe 10, so that wax passing from the filter system through a pipe 13 contains a minimum of oil. This wax cake is heated and melted in a heater 14 and the melt is passed into a flash vessel 81. In flash vessel 81 the solvent, methylethylketone, is flashed from the wax and the flashed vapors passing through a pipe 83 to storage are condensed in a condenser 85. This flashing operation removes the majority of the methylethylketone and in order to remove final traces of the keton the flash vessel bottoms are passed through a pipe 79 into a stripper 73 into which stripping steam is introduced from a pipe 75. The methylethylketone-steam vapors are passed through a pipe 70 and are condensed in a condenser 93, the condensate being passed through a mixing device 37 into a phase separation vessel 31. Wax, free of diluent, is removed from the stripper 73 and is passed to a wax storage, not shown, through a pipe 77 as one of the products of the operation.

The combined filtrate and diluent-oil washings from the filter system 11 are passed by way of the pipe 15 into a filtrate run storage tank 89. From this run storage tank filtrate is passed through a pipe 91, a heater 18, and on through a pipe 17 into a flash vessel 19 in which diluent or solvent is flash vaporized from the dewaxed oil. The flashed vapors are removed from flash vessel 19 by way of a pipe 21 and are condensed in a condenser 22 in route to the diluent storage tank 5. The flash vessel bottoms still contain at least a trace of solvent and this material is passed through a pipe 23 into a stripper tower 25 in which steam from a pipe 64 removes the final traces of diluent from the oil. The stripper bottoms, free of solvent, is removed through pipes 65 and 67 and is passed therefrom to oil storage, not shown. The stripper overhead vapors of steam and solvent are condensed in a condenser 29 and the condensate is passed through pipes 27 and 71 and mixer 37 into the phase separator vessel 31. In the phase separator 31 a water-rich phase 33 settles to the bottom and a solvent-rich phase 35 which contains oil and dissolved water floats on the water-rich layer. The solvent-rich phase 35 is passed through a pipe 39 into a flash tower 41. Sufficient finished oil for the process is passed from pipe 65 through a pipe 69 and a pipe 72 and is added to the methylethylketone water condensates passing into mixer 37. This dewaxed oil added to the ketone-water mixtures extracts the major portion of the ketone from the water to produce the ketone-rich phase 35. Since water is quite insoluble in such a dewaxed oil this oil assists in precipitating the water from the ketone-oil-water solution. In this manner there is a substantial layer of water 33 in the bottom of vessel 31. This water phase 33 is removed from separator vessel 31 through a liquid level controller-valve assembly 99 which regulates the rate of flow of this water through a pipe 51 into an azeotrope still 53. In this azeotrope still temperature and pressure conditions are maintained such that an azeotrope of methylethylketone and water is removed as overhead vapors through a pipe 55, and the water, in excess over that reqired to form the azeotrope, being removed from the still through a pipe 61. Steam for this azeotropic distillation operation is introduced through a pipe 59. The azeotropic vapors are condensed in a condenser 57 and the condensate is combined with the methylethylketone and the water from pipe 71 and the several combined steams are mixed with oil from pipe 72 and passed through mixer 37 into the phase separator 31. Phase separation in this vessel takes place as previously described.

The ketone rich oil and water containing layer 35 is passed through a pipe 39 into the flash tower 41 in which ketone and water are flashed from the oil. The flash vapors leave flash tower 41 through a pipe 45, are condensed in a condenser 46 and the condensate passed into an azeotropic still 47 which is operated at such temperature and pressure that an azeotropic mixture of ketone and water leaves the still through a pipe 63 to be combined with the azeotropic vapors in pipe 55. The methylethylketone in excess of that removed as azeotropic vapors leaves still 47 through a pipe 49 as a dry ketone and this dry ketone is passed on to the solvent storage tank 5. In this manner this portion of the methylethylketone passing from the bottom of the azeotropic still 47 is truly a dry material. Steam for carrying out this azeotropic distillation is introduced into still 47 through a pipe 103.

The flash bottoms from the lower portion of flash tower 41 is the oil, as previously stated, that is mixed with water-methylethylketone from pipes 71, 55 and 63. This oil is removed from the flash tower 41 through a pipe 43 and is cycled in the system through valve 44 and through pipe 72 for addition to the water-ketone mixture prior to their entry into mixer 37.

In starting up this system dewaxed oil from pipe 65 is passed through valved pipe 69 and through pipe 72 into mixer 37. Oil from separator 31 flows with the ketone through pipe 39 into flash vessel 41 and the flash bottoms pass through pipe 43 and valve 44 back into pipe 72. As soon as a required volume of dewaxed oil is passed through pipe 69 for circulating in the separator 31-flash vessel 41 then the valve in pipe 69 is closed and this oil merely circulates or cycles from separator tank 31 to the flash vessel 41 and back to separator again. After the valve in pipe 69 is closed all of the oil from pipe 65 is passed on through pipe 67 as the dewaxed oil product of the operation.

When it is desired to close down the separator 31-flash tower 41 portion of the system it is merely necessary to close the valve 44 and to open the valve in a pipe 70 and allow the flash tower bottoms from flash tower 41 to flow through pipe 74 into pipe 23 for addition to the oil flowing therein. These combined oils are introduced into stripper 25 which removes by steam stripping all of the ketone to allow finished dewaxed ketone-free oil to be removed through pipes 65 and 67 as product.

A pipe 87 is provided for passage of solvent or diluent from a source, not shown, for starting up the operation or for the addition of makeup solvent as required.

Methylethylketone has a normal boiling point of approximately 175° F., and heaters 18 and 14 are operated to heat the materials passing therethrough so that upon entry into their respective flash tanks the major portions of the methylethylketone are flash vaporized. It is preferable to flash vaporize the major portion of the methylethylketone in this manner because the methylethylketone so separated and recovered contains very little water and after condensation is suitable for reuse. It is found however that flashed methylethylketone streams passing through from the respective flash tanks are not strictly dry.

About the only opportunity water has for entering this portion of the system is that carried in solution with the wax distillate feed. As is known water is only very slightly soluble in hydrocarbon oils but water once introduced into the system remains largely therein and finally builds up an appreciable concentration of water in the solvent. I have found according to the present invention that by removing water as bottoms from azeotrope still 53, that is, water added mainly in the steam stripping and azeotrope distillations carried out in vessels 73, 25, 47 and 53, that the water buildup in the methylethlyketone in storage tank 5 is held at a minimum. All stripping and distillation vessels into which steam is passed are provided with conduits for carrying the overhead water-containing materials into the phase separation vessel 31 in which the major portion of the water settles as water phase 33. Water which remains in solution in the methylethylketone oil phase in separator 31 is finally returned to this separator vessel and ultimately is separated as the water layer. With very small concentrations of water being contained in the flash ketone vapors from vessels 81 and 19 and the ketone removed from the azeotrope still 47 through pipe 49 being truly dry, maintains the overall water content of the ketone in storage vessel 5 well below concentrations which cause trouble in chiller 9 and filter 11. Thus, I find by operation of the azeotrope still 47 to produce at least a small portion of the recycle methylethylketone as a truly dry ketone that a water level of the solvent in storage vessel 5 is maintained well within operable limits.

Strippers 25 and 73 are so operated in regards to temperature, pressure and rates of steam introduction that the final traces of methylethylketone are removed from the oil product and from the wax product respectively. The azeotrope still 53 is similarly operated, that is, it is operated as regards temperature, pressure, and rate of steam introduction so that all of the methylethylketone is recovered overhead as an azeotrope and only water is removed from the kettle. Conversely, azeotrope still 47 is operated as regards temperature, pressure, and rate of steam introduction so that substantially only azeotrope is removed overhead through pipe 63 and only truly dry methylethylketone is removed through pipe 49 for recycling to solvent storage 5. The operation of such flash vessels, strippers and azeotrope still are well understood by those skilled in the art and their details of operation are therefore not given.

In settler 31 is is preferable to provide for a settling time of approximately 30 minutes. Limits on the settling time may vary from about 10 minutes minimum to 24 hours maximum. However, this settling vessel 31 can in some instances be eliminated with the substitution of a centrifugal separator. It is preferable that separation be carried out at approximately atmospheric temperature but if the occasion should arise temperatures as high as 170° F. can be used. Pressures maintained in the system are not specifically critical and particularly in the separation vessel 31 because solubility relations of the constituents within the vessel are not altered to an appreciable extent by pressure. However ample pressure is provided in various portions of the system for material flow and to provide for flashing in the several flash vessels.

The rate of oil passage or recycle through pipe 72 is not particularly critical but in general the content of the oil in the mixture passing through mixer 37 should not be less than 10 percent, that is, it should be 10 percent or more by volume. I find that a preferable concentration of oil at this point of the process is about 30 percent by volume. Preferred operating limits of oil content vary from about 20 percent to about 50 percent by volume. Larger percentages of oil are operable but would be uneconomical because of heat requirements to heat up the oil and ketone in heater 39a to flash the ketone from the oil, and for steam to azeotropically distill the water These above data illustrate that petroleum hydrocarbon material, of which Stoddard solvent is representative, does extract methylethylketone efficiently from a methylethylketone-water mixture.

Solubility runs were made to illustrate the degree of extraction of methylethylketone from water-methylethylketone mixtures containing various concentrations of the three constituents, i.e., the water, the oil and the methylethylketone in the feed to these extraction runs. The oil used was a solvent-free filtrate oil filtered at dewaxing temperature from a Santa Ana, Venezuela, crude oil. The feed mixtures were thoroughly contacted at 140° F. and phase separations allowed to take place at this temperature. The water contents of the upper or methylethylketone phases were determined by a modified Karl Fischer method (see Anal. Chem. 27, 450–453, March 1955).

*Table II*

| Run No. | Feed, Wt. Percent | | | MEK Phase, Wt. Percent | | | Water Phase, Wt. Percent | | | MEK Phase, Vol. Percent of Feed | Wt. Percent Water in MEK in top Phase-Oil-Free Basis |
|---|---|---|---|---|---|---|---|---|---|---|---|
| | MEK | Oil | Water | MEK | Oil | Water | MEK | Oil | Water | | |
| 1 | 78.5 | 10.0 | 11.5 | 81.0 | 10.3 | 8.7 | 28.9 | (1) | 71.1 | 95.5 | 9.7 |
| 2 | 72 | 17.0 | 10.6 | 75.6 | 17.9 | 6.5 | 12.0 | (1) | 88.0 | 95.0 | 7.9 |
| 3 | ²67.0 | ²24.0 | ²9.0 | 68.5 | 26.4 | 5.1 | 51.1 | (1) | 48.9 | 91.0 | 6.9 |
| 4 | 61.0 | 30.0 | 9.0 | 64.2 | 31.8 | 4.0 | 13.3 | (1) | 86.7 | 94.0 | 5.9 |
| 5 | 43.6 | 50.0 | 6.4 | 45.7 | 52.5 | 1.8 | 6.0 | (1) | 94.0 | 95.0 | 3.8 |
| 6 | 17.5 | 80.0 | 2.5 | 17.8 | 82.0 | 0.2 | | | | 97.5 | 1.1 |

¹ No oil.
² Vol. percent.

and ketone required to form an azeotrope from the remainder of the ketone.

One of the important advantages of my process is that the diluent methylethylketone is recovered by an oil which is not a waxy oil feed to the process, thereby permitting crystallization of wax in the absence of diluent and thus the formation of the type of wax crystals for most efficient filtration and washing. By this process the waxy distillate is fully chilled and the wax crystals are fully formed prior to the addition of any diluent.

Another advantage of my invention is that the diluent recovery system can be operated independently of the wax precipitation system, that is, the diluent recovery system can be operated on filtrate from the filtrate run storage tank 89 at times when the wax chiller or crystallizer and filtration system are not in operation.

As examples of the operability of my process, two runs were made using a Podbielniak contractor for effecting the extraction of methylethylketone from aqueous methylethylketone by Stoddard solvent. Substantially pure water was removed from the contactor and refractive index measurements thereon indicated that the removed water phase was substantially pure water, that is, free from methylethylketone and the Stoddard solvent-ketone phase contained substantially no water. These tests further indicate the operability of the oil as regards extracting the methylethylketone from the water-methylethylketone mixture in mixer 37. In the following tabulation are the data resulting from the two runs using the Podbielniak contractor as the liquid contacting unit.

*Table I*

| | Run No. 1 | Run No. 2 |
|---|---|---|
| Volume ratio wet MEK to Stoddard Solvent | 0.685 | 1.60 |
| Charge Rate to Contactor—wet MEK, lbs./hr | 9.78 | 9.78 |
| Products of Contactor: | | |
| Water phase, lbs./hr | 1.271 | 1.271 |
| MEK phase, lbs./hr | 8.51 | 8.51 |
| Charge Rate—Stoddard Solvent, lbs./hr | 13.50 | 5.50 |
| Yield: | | |
| Stoddard Solvent—ketone phase, lbs./hr | 22.1 | 14.0 |
| Water phase, lbs./hr | 0.786 | 0.892 |
| Percent Recovery (total liquids) | 98.63 | 97.44 |

It will be noted in Table II that high concentrations of oil in the feed to these runs produced an upper phase of low water content, which means the extraction of methylethylketone from water was more nearly complete than when a low concentration of oil in the feed was used, see run No. 1, Table II.

In the following example are given run data of the process as illustrated in the drawing in which flow rates and compositions are given.

*Table III*

| Vessel or Pipe | Material—Gallons Wax Distillate | | | |
|---|---|---|---|---|
| | Methylethylketone | Water | Oil and/or Wax | Total |
| 1 | | | 818 | 818 |
| 7 | 2,454 | | | 2,454 |
| 13—wax—MEK | 147 | | 287 | 434 |
| 15—filtrate | 2,310 | | 532 | 2,842 |
| 91—filtrate | 2,310 | | 532 | 2,842 |
| 21—MEK | 2,078 | | | 2,078 |
| 23 | 238 | | 532 | 770 |
| 27—azeotrope | 238 | 37 | | 275 |
| 64 | | 37 | | 37 |
| 65 | | | 532 | 532 |
| 67—oil product | | | 532 | 532 |
| 83—MEK | 131 | | | 131 |
| 79—wax—MEK | 16.5 | | 286.5 | 303 |
| 77—wax | | | 286.5 | 286.5 |
| 70—Azeo+H₂O | 16.5 | 4 | | 20.5 |
| 75—steam | | 4 | | 4 |
| 61—water | | 45 | | 45 |
| 49—MEK | 254 | | | 254 |
| 43—oil | 4 | | 245.5 | 249.5 |
| 37—{oil—MEK / water} | 500 | 73.5 | 245.5 | 818 |
| 35—MEK—oil | 493.5 | 31 | 245.5 | 770 |
| 33—Water—MEK | 6.5 | 42.5 | | 49 |
| 39—MEK—oil | 493.5 | 31 | 245.5 | 770 |
| 45—moist MEK | 489 | 31 | | 520 |
| 63—azeotrope | 235 | 31 | | 266 |
| 49—dry MEK | 254 | | | 254 |
| 51—water—MEK | 6.5 | 42.50 | | 49 |
| 59—steam | | 3.3 | | 3.3 |
| 55—azeotrope | 6.5 | .8 | | 7.3 |
| 72—oil | | 4 | 245.5 | 249.5 |
| 71—MEK—water | 254 | 41.8 | | 295.8 |
| 61—water | | 45 | | 45 |

Temperatures, pressures and other operating conditions are not given because the selection of these is well understood by those skilled in the art. Such auxiliary apparatus as pumps, valves, and pressure and temperature indicating, recording and control apparatus and flow control apparatus are not illustrated in the drawing nor described in the specification for purposes of brevity. The need for such auxiliary equipment, its installation and operation are well understood by those skilled in the art.

As mentioned hereinbefore a very small amount of water is frequently carried into the system in the charge oil. At least a portion, and usually a substantial portion, of this water is flashed from the wax in flash vessel 81 and from the oil in flash vessel with the ketone. Water in this manner is returned to the solvent storage 5. Conditions can occur under which this returned water accumulates in the solvent storage to an undesired high concentration. When water so accumulates in the ketone storage, the valves in pipe 104 and in pipe 105 are opened to allow passage of bleed-streams of the moist ketone to be cycled to the ketone azeotrope still 47. In this manner the moisture content of the ketone in the storage vessel 5 is reduced. The rates of flow of moist ketone in pipes 104 and 105 are small, such as 1 percent of the ketone flowing in pipes 83 and 21. Less than 1 percent is, in some instances, sufficient for reducing the moisture content of the ketone in storage tank 5 and once sufficiently dry, still less recycle in pipes 104 and 105 is sufficient to maintain the ketone in a suitably dry condition.

While certain embodiments of the invention have been described for illustrative purposes, the invention obviously is not limited thereto.

I claim:
1. A process for dehydrating an aqueous oil-diluent mixture comprising, mixing a dewaxed oil with said mixture thereby producing an oil diluent phase containing said oil and dissolved water and a water phase containing dissolved oil diluent, separating these phases, flash vaporizing the separated oil diluent phase thereby producing a vaporous oil diluent-water mixture and a flashed oil bottoms, condensing the vaporous mixture thereby producing a condensate, distilling said condensate to produce an overhead vaporous azeotrope of said diluent and water and a dry bottoms of oil diluent and recovering this latter oil diluent as a dehydrated product of the operation.

2. The process of claim 1 wherein the oil diluent is methylethylketone.

3. A process for dehydrating an aqueous oil diluent mixture comprising, mixing a dewaxed oil with said mixture thereby producing an oil diluent phase containing said oil and dissolved water and a water phase containing dissolved oil diluent, separating these phases, flash vaporizing the separated oil diluent phase thereby producing a vaporous oil diluent-water mixture and a flashed oil bottoms, condensing the vaporous mixture thereby producing a condensate, steam stripping said condensate to produce an overhead vaporous azeotrope of said diluent and water and a dry bottoms oil diluent and recovering this latter oil diluent as a dehydrated product of the operation.

4. The process of claim 3 wherein said oil diluent is methylethylketone.

5. A method for recovering a dry wax deoiling diluent from a dewaxed oil-diluent mixture comprising, flash vaporizing at least a portion of said diluent from said mixture, steam stripping the remainder of the diluent from the flash vaporized bottoms, condensing the steam-stripped diluent to produce a first condensate and separating a diluent-rich phase therefrom comprising diluent containing dissolved water and a water-rich phase comprising water containing dissolved diluent, withdrawing dewaxed oil free of diluent from the steam stripping operation, dividing this withdrawn oil into two portions, adding one portion to said first condensate prior to separating said diluent-rich phase, flash vaporizing diluent and said dissolved water from said diluent-rich phase, condensing flashed vapors from this latter flash vaporizing operation thereby producing a second condensate, steam stripping said second condensate thereby producing a vaporous overhead diluent-water azeotrope and a dry bottoms diluent, condensing said overhead diluent-water azeotrope, adding this condensed azeotrope to the first mentioned condensate and recovering said dry bottoms diluent as the dry wax deoiling diluent of the operation.

6. A method for recovering a dry wax deoiling diluent from a dewaxed oil-diluent mixture comprising flash vaporizing at least a portion of said diluent from said mixture, distilling the remainder of the diluent from the flash vaporized bottoms, condensing these distilled diluent to produce a first condensate and separating a diluent-rich phase therefrom comprising diluent containing dissolved water and a water-rich phase comprising water containing dissolved diluent, withdrawing dewaxed oil free of diluent from the distilling operation, dividing this withdrawn oil into two portions, adding one portion to said first condensate prior to separating said diluent-rich phase, flash vaporizing diluent and said dissolved water from said diluent-rich phase, condensing flash vapors from this latter flash vaporizing operation thereby producing a second condensate, distilling said second condensate thereby producing a vaporous overhead diluent-water azeotrope and a dry bottoms diluent, condensing said overhead diluent-water azeotrope, adding this condensed azeotrope to the first mentioned condensate and recovering said dry bottoms diluent as a dry waxed deoiling diluent of the operation.

7. A continuous process for deoiling wax of a waxy oil feed comprising chilling the oil feed to a wax precipitation temperature, chilling methylethylketone to substantially said temperature, mixing the chilled methylethylketone and chilled feed, filtering precipitated wax from the mixture to produce a wax containing a minor amount of methylethylketone and oil and a filtrate comprising dewaxed oil and methylethylketone, flash vaporizing the methylethylketone from the wax-methylethylketone-oil mixture to produce a first methylethylketone flash vapor, and a flashed wax bottoms, steam stripping the remainder of the methylethylketone from the flashed wax bottoms thereby producing a first vaporous water-methylethylketone mixture and a methylethylketone-free wax, condensing said first vaporous water-methylethylketone mixture and introducing the condensate into a phase separation step subsequently described, flash vaporizing the methylethylketone of said filtrate thereby producing a flashed oil containing a minor proportion methylethylketone and a second methylethylketone flash vapor, steam stripping the flashed oil to produce a methylethylketone-free oil and a second vaporous water-methylethylketone mixture, condensing this latter vaporous water-methylethylketone mixture, introducing this latter formed condensate into said phase separation step, separating in said phase separation step a methylethylketone-rich phase containing oil as subsequently produced and dissolved water and a water-rich phase containing dissolved methylethylketone, azeotropically distilling said water-rich phase to produce a first methylethylketone-water azeotrope and a bottoms water product, condensing this azeotrope and introducing same into said phase separation step, withdrawing said water product from the azeotrope distilling step, flash vaporizing said methylethylketone-rich phase containing oil and water to produce a vaporous methylethylketone and water mixture and a flashed oil bottoms, condensing this latter mixture and azeotropically distilling the condensate thereby producing a second vaporous methylethylketone-water azeotrope and a dry bottoms methylethylketone, condensing this latter vaporous azeotrope and introducing the condensate into said phase separation step, withdrawing flashed oil bottoms from the flash vaporizing of said methylethylketone-rich phase as said oil as subsequently produced, withdrawing said dry bottoms methylethylketone from the latter azeotrope distilling step, condensing the first and second methylethylketone flash vapors, combining the bottoms methylethylketone and the condensed first and second methylethylketone flash vapors as the first mentioned methylethylketone, mixing said flashed oil bottoms with the condensed first and second water-methylethylketone mixtures and with the condensed first and second azeotropes prior to introduction of these latter mentioned condensed mixtures and azeotropes into said phase separation step and removing said dewaxed and methylethylketone-free oil as a main product of the operation.

References Cited in the file of this patent

UNITED STATES PATENTS

| | | |
|---|---|---|
| 2,443,532 | Berg | June 15, 1948 |
| 2,526,722 | Beavon | Oct. 24, 1950 |
| 2,685,556 | Hachmuth | Aug. 3, 1954 |
| 2,742,401 | Kinchen | Apr. 17, 1956 |
| 2,802,018 | Ton | Aug. 6, 1957 |